US005178023A

United States Patent [19]

Domke et al.

[11] Patent Number: 5,178,023

[45] Date of Patent: Jan. 12, 1993

[54] METHOD AND APPARATUS FOR SEALING A PACKAGING CONTAINER OVERPRESSURE VALVE

[75] Inventors: Klaus Domke, Ditzingen; Fritz Gaukler, Stuttgart, both of Fed. Rep. of Germany

[73] Assignee: Robert Bosch GmbH, Stuttgart, Fed. Rep. of Germany

[21] Appl. No.: 648,108

[22] Filed: Jan. 31, 1991

[30] Foreign Application Priority Data

Mar. 14, 1990 [DE] Fed. Rep. of Germany ....... 4008097

[51] Int. Cl.[5] .............................................. G01J 1/00

[52] U.S. Cl. .................................. 73/865.9; 250/342

[58] Field of Search .................... 73/168, 865.8, 865.9; 209/509, 513, 524, 536, 576–578; 250/301, 304, 338.5, 342; 29/407; 222/146.2, 146.5, 154

[56] References Cited

U.S. PATENT DOCUMENTS 1,933,403 10/1933 Wilson ............................ 222/146.5

4,428,223 1/1984 Trevisan ............................ 73/168

FOREIGN PATENT DOCUMENTS 0220516 4/1985 Fed. Rep. of Germany ...... 209/576

2304058 10/1976 France .............................. 73/865.8

1274449 5/1972 United Kingdom ................ 209/577

*Primary Examiner*—Robert Raevis

*Attorney, Agent, or Firm*—Edwin E. Greigg; Ronald E. Greigg

[57] ABSTRACT

For sealing off overpressure valves of packaging containers, a small quantity of liquid sealant is introduced into a valve. To check whether such valve has been equipped with sealant, the sealant is heated, prior to introduction into the valve, to a temperature that is elevated compared with ambient temperature. After that the valve is checked for a temperature difference with a heat sensor, which causes valves not equipped with sealant to be rejected. The sealant is heated immediately prior to its application to a valve, in a nozzle delivering it.

17 Claims, 1 Drawing Sheet

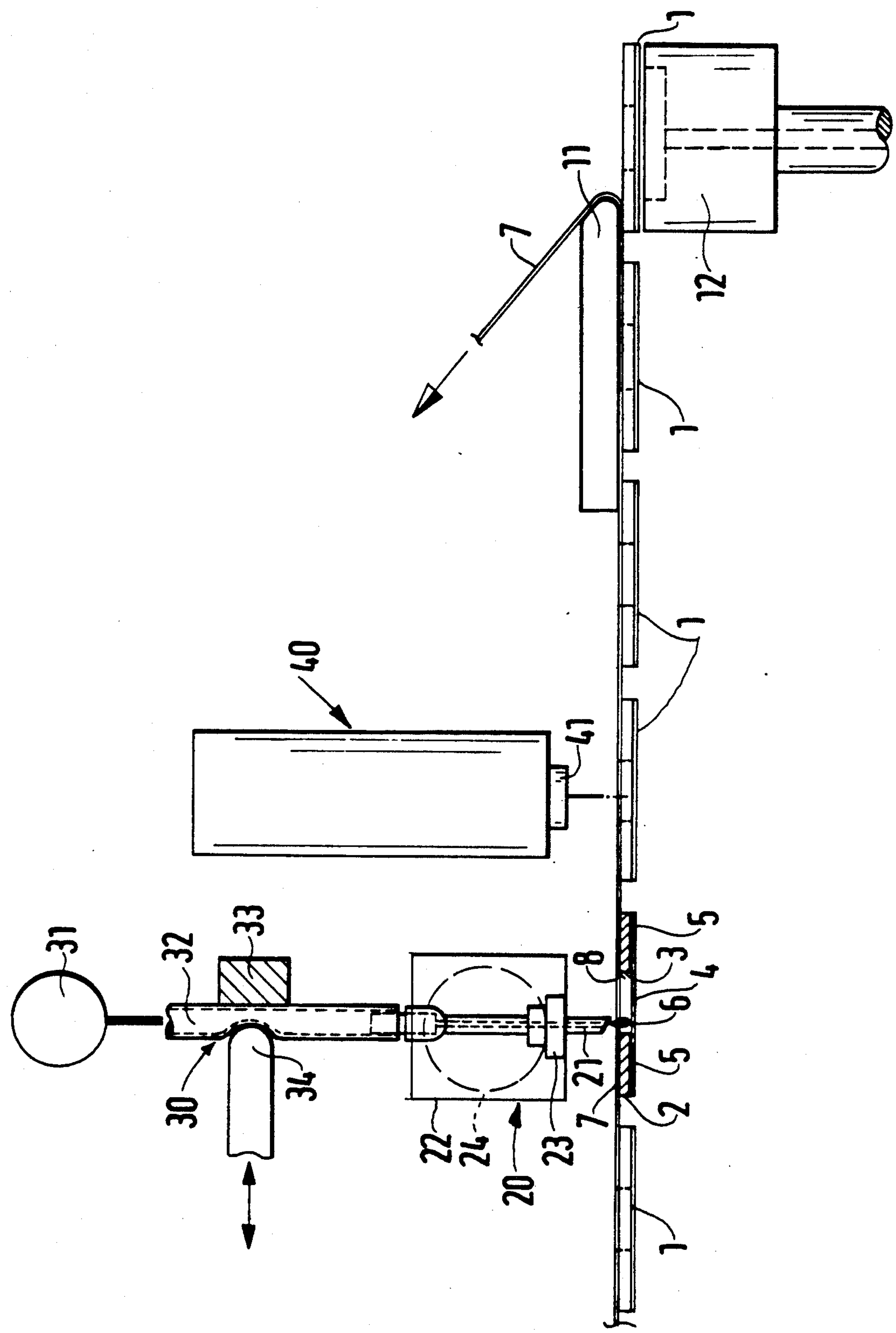
1
11
7
12
1
1
40
41
31
32
33
30
34
8
3
4
5
6
5
21
7
2
22
24
20
23
1

METHOD AND APPARATUS FOR SEALING A PACKAGING CONTAINER OVERPRESSURE VALVE

BACKGROUND OF THE INVENTION

The invention is directed to improvements in a method for sealing off an overpressure valve for a packaging container.

It is known for overpressure valves on packaging containers to allow gas produced by the product in the container—such as carbon dioxide in the case of coffee—to escape from the packaging container at a certain overpressure yet to prevent air and thus oxygen from coming into contact with the product. Such valves are generally equipped with a liquid sealant, such as silicone oil. The sealant disposed between the valve elements does not impair the opening of the valve, but in the closed position of the valve it prevents oxygen molecules from passing through the valve into the packaging container through tiny channels formed between uneven portions of the contacting surfaces of the valve elements. By a method disclosed in European Patent Document B 12 874, the liquid sealant is applied with a nozzle to an inlet or outlet end of the valve channel formed by foil elements; from there, it penetrates the channel by capillary attraction. It may sometimes happen, for instance if the applicator is defective or if the sealant supply is exhausted, that valves may not be equipped with sealant, so that their tightness does not meet requirements. Packaging containers thus provided with unsealed valves do not assure the necessary protection for the product, so that the product prematurely loses its quality or even spoils as a result of oxidation. Until now, it was not possible to check whether a valve was activated with sealing fluid. Although it has already been proposed that the presence of sealant in a valve be ascertained optically with the aid of a photoelectric cell, the results were not satisfactory.

OBJECT AND SUMMARY OF THE INVENTION

It is a principal object of the invention to provide a method as defined hereinafter having the advantage that the presence of sealant in a packaging container overpressure valve can be checked simply, yet with high reliability. By evaluating the outcome of the check, valves not equipped with sealant can then be precluded from being used.

A particularly simple provision is to heat only a small quantity of sealant at a time and to do so immediately prior to applying it to a valve. The presence of sealant can be checked particularly simply and reliably in a valve by purposefully monitoring the site where sealant is supplied in the valve; this can be done with an infrared sensor. In an apparatus for performing the method of the invention, in which the sealant is delivered by a nozzle, it is particularly advantageous if the nozzle is thermally conductively connected to a heater element.

The invention will be better understood and further objects and advantages thereof will become more apparent from the ensuing detailed description of a preferred embodiment taken in conjunction with the drawing.

BRIEF DESCRIPTION OF THE DRAWING

The sole figure of the drawing shows an apparatus for introducing sealant into valves and for checking for the presence of sealant in the valves.

DESCRIPTION OF THE PREFERRED EMBODIMENT

In the method according to the invention, sealed off with a liquid sealant, for instance silicon oil. Such valves 1, which are for instance described in European Patent Document B 23 703, can substantially comprise a stiff base plate 2, which has an aperture 3, and a flexible backing foil 4 that covers the base plate and its central aperture; this foil is glued to the base plate 2 at two parallel zones on the edge, defining a valve channel 5 in the middle. The sealant is introduced into the valve channel 5, for instance in accordance with European Patent Document B 12 874, by application in the form of a droplet 6 onto an outer end on the edge of the valve 1 or onto an inner end in the region of the aperture 3 of the base plate; from there it is drawn into the channel 5 by capillary attraction. Equipping such valves 1 with sealant is preferably performed before or after the valve is joined to a packaging container. Instead of applying sealant to one end of the valve channel 5, it is also possible to introduce the sealant directly, through a thin nozzle introduced into the valve channel.

In the exemplary embodiment shown, valves 1 are supplied in a row, sticking to a carrier strip 7; are equipped, in this arrangement, with a sealant; then are peeled off from the carrier strip 7 at a deflection edge 11 of the carrier strip 7 and transferred with a suction die 12 to a packaging container. The carrier strip 7, which has openings 8 each coinciding with one aperture 3 of the base plate 2 of each valve 1, is advanced incrementally in a horizontal plane; the valves are disposed on its underside, so that the inner ends of the valve channel 5 are accessible from above through the opening 8 and through the aperture 3 in the base plate 2, and the backing foil 4 forms a bottom.

A sealant delivery device 20 is disposed at one station along the delivery route of the carrier strip 7; it has a nozzle 21 in the form of a hollow needle, pointing downward and ending just above the carrier strip 7 in the region of an opening 8. Preferably the nozzle 21 ends not centrally, but rather near the edge of the opening 8 of the carrier strip 7 or of the aperture 3 in the base plate 2 of a valve 1, so that a droplet 6 of sealant expressed by the nozzle 21 and dropped through the opening 8 and the aperture 3 onto the backing foil 4 of a valve 1 comes at least partly into contact with the edge of the aperture 3 of the base plate 2 that defines one end of the valve channel 5. For this purpose it may be useful to advance the carrier strip 7 on an incline, so that the droplet 6, dropped on the then likewise inclined backing foil 4, will flow to the edge of the aperture 3 of the base plate 2 and from there into the valve channel 5 or parts of it.

For dosage of the necessary quantity of sealant for a volume of approximately 4 to 6 $m^3$, the nozzle 21 is connected to a metering device 30 and a sealant supply container 31. In the exemplary embodiment shown, the metering device 30 comprises a flexible tube 32 that connects the supply container 31, which is at slight overpressure, with the nozzle 21 and a clamping jaw 34 pressing the tube 32 against a fixed stop 33; the clamping jaw is pulled incrementally away from the stop 33. Each time the clamping jaw 34 is briefly retracted, a small quantity of sealant flows in the tube 32 to the nozzle 21, emerges from its lower end in the form of a droplet 6, and is received by the valve 1 furnished there.

To check whether a quantity of sealant has been introduced into each valve 1, a monitoring apparatus 40, is provided at the station following the sealant delivery apparatus 20. This apparatus has a heat sensor 41, which responds to a temperature difference between a location being homed in on and its surroundings. The monitoring apparatus 40, like the sealant delivery device 20, is disposed above the delivery plane of the carrier strip 7, and its heat sensor 41 is aimed at the point on the carrier strip 7 or on the valve 1 onto which a droplet 6 of sealant was previously deposited by the nozzle 21.

In order for the monitoring apparatus 40 to respond upon the presence of sealant in a valve 1, the sealant is supplied to the valves 1 at a temperature that is elevated compared with the ambient temperature. To this end, the metal nozzle 21 is thermally conductively received in a protrusion 23 of a heating element 22 containing a temperature-regulated electric heating cartridge 24. The nozzle 21 is heated by the heating element 22 such that the small quantity of sealant located in the nozzle is heated to a temperature in the range from 40° to 100° C., preferably 60° to 80° C. As a result of this arrangement, only a small quantity of sealant at a time is heated to a temperature that is elevated compared with the ambient temperature and compared with the valves 1 as delivered, and the sealant is not heated until just before it is introduced into a valve 1.

If the monitoring apparatus 40 ascertains a temperature difference for the valve 1 brought within its scanning range at a certain time, this means that sealant is present in the monitored valve 1, and that this valve 1 can be joined to a packaging container. Contrarily, if the monitoring apparatus 40 ascertains no temperature difference, then it controls the sealant delivery device such that although the die 12 does pick up the applicable valve once it comes within range of the sealant delivery device, it will not secure it to a packaging container but instead rejects it.

The monitoring apparatus 40, which preferably comprises an infrared temperature difference measuring instrument, can be disposed on the side of the valve on which the sealant is supplied, as shown in this exemplary embodiment; or it may be disposed on the opposite side, in which case it does not scan the applied sealant directly but instead scans the thin backing foil at the point at which the sealant has been applied.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A method for sealing off a packaging container overpressure valve and testing same in which a liquid sealant is disposed between sealing faces of valve elements comprising the steps of introducing the liquid sealant into the valve (1) at a elevated temperature compared with the ambient temperature, and monitoring the valve for an elevated temperature compared with the ambient temperature.

2. A method as defined by claim 1, comprising the further step of heating the sealant immediately prior t its introduction into the valve.

3. A method as defined by claim 2, comprising the further steps of incrementally delivering a plurality of valves disposed in a row and adhered to a carrier strip to a sealing off station, successively equipping said valves with a heated sealant, checking said valves for an elevated temperature, feeding valves for which a temperature difference has been ascertained to an application station for application to packaging containers, and rejecting valves for which no such temperature difference is ascertained.

4. A method as defined by claim 2, wherein said step of heating said sealant includes heating same to a temperature in the range of 40° to 100° C.

5. A method as defined by claim 4, wherein said step of monitoring the temperature of the valve includes aiming an infrared sensor at a point of sealant application.

6. A method as defined by claim 4, comprising the further steps of incrementally delivering a plurality of valves disposed in a row and adhered to a carrier strip to a sealing off station, successively equipping said valves with a heated sealant, checking said valves for an elevated temperature, feeding valves for which a temperature difference has been ascertained to an application station for application to packaging containers, and rejecting valves for which no such temperature difference is ascertained.

7. A method as defined by claim 2, wherein said step of monitoring the temperature of the valve includes aiming an infrared sensor at a point of sealant application.

8. A method as defined by claim 1, wherein said step of monitoring the temperature of the valve includes aiming an infrared sensor at a point of sealant application.

9. A method as defined by claim 8, comprising the further steps of incrementally delivering a plurality of valves disposed in a row and adhered to a carrier strip to a sealing off station, successively equipping said valves with a heated sealant, checking said valves for an elevated temperature, feeding valves for which a temperature difference has been ascertained to an application station for application to packaging containers, and rejecting valves for which no such temperature difference is ascertained.

10. A method as defined by claim 1, comprising the further steps of incrementally delivering a plurality of valves disposed in a row and adhered to a carrier strip to a sealing off station, successively equipping said valves with a heated sealant, checking said valves for an elevated temperature, feeding valves for which a temperature difference has been ascertained to an application station for application to packaging containers, and rejecting valves for which no such temperature difference is ascertained.

11. An apparatus for sealing off a packaging container overpressure valve including an aperture in at least one valve disposed on a carrier strip, comprising a nozzle means including a dispensing end for dispensing one drop of liquid sealant into said aperture, a heating element is thermally conductively connected to said nozzle means, said liquid sealant being heated by said heating element to a temperature above ambient before dispensing said one drop of sealant into said aperture, and a monitoring means for detecting the presence of a heated liquid sealant on a valve subsequent to being dispensed by said nozzle means.

12. An apparatus for sealing off a packing container valve as set forth in claim 11, in which said monitoring means is an infrared sensor aimed at a point of sealant application into said aperture.

13. An apparatus for applying a sealant to an overpressure valve and then determining the presence of the sealant which comprises a dispensing means including a sealant, a heating means for heating the sealant, a carrier strip on which at least one package overpressure valve to be sealed off is disposed, means for moving the carrier strip and the valve to the dispensing means including the sealant, and a heat sensor monitoring apparatus for determining the presence of a sealant in the package overpressure valve.

14. An apparatus as set forth in claim 13 in which said carrier strip includes equally spaced apertures to which said overpressure valves are aligned for receiving a drop of sealant.

15. An apparatus as set forth in claim 14 in which said dispensing means dispenses a drop of sealant into each overpressure valve of said carrier strip when the valves disposed thereto are moved seriatim to the sealant dispensing means.

16. An apparatus as set forth in claim 14 which includes means for removing said overpressure valves from said carrier strip.

17. An apparatus for applying a sealant to a packaging container overpressure valve and then determining the presence of the sealant in said valve which comprises a dispensing means for dispensing a sealant, a heating means for heating the sealant to be dispensed, a heat sensor monitoring apparatus for determining the presence of a sealant in the package overpressure valve and a conveying means for presenting said overpressure valve to said dispensing means and said monitoring means.

* * * * *